(12) United States Patent
Avila et al.

(10) Patent No.: US 11,953,619 B2
(45) Date of Patent: *Apr. 9, 2024

(54) RADAR-BASED SYSTEM FOR SENSING TOUCH AND IN-THE-AIR INTERACTIONS

(71) Applicant: SAMSUNG ELECTRONICS CO., LTD., Gyeonggi-Do (KR)

(72) Inventors: Santiago Ortega Avila, Sunnyvale, CA (US); Cody Wortham, Mountain View, CA (US); Sajid Sadi, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,165

(22) Filed: Dec. 2, 2021

(65) Prior Publication Data

US 2022/0091233 A1    Mar. 24, 2022

Related U.S. Application Data

(63) Continuation of application No. 15/889,149, filed on Feb. 5, 2018, now Pat. No. 11,243,293.

(Continued)

(51) Int. Cl.
*G01S 7/41* (2006.01)
*G01S 13/42* (2006.01)
(Continued)

(52) U.S. Cl.
CPC .............. *G01S 7/415* (2013.01); *G01S 13/42* (2013.01); *G01S 13/876* (2013.01); *G01S 13/88* (2013.01);
(Continued)

(58) Field of Classification Search
CPC ........ G01S 7/415; G01S 13/42; G01S 13/876; G01S 13/88; G06F 3/04166; G06F 3/017;
(Continued)

(56) References Cited

U.S. PATENT DOCUMENTS 8,314,732 B2   11/2012   Oswald et al.
8,341,732 B2   12/2012   Croft et al.
(Continued)

FOREIGN PATENT DOCUMENTS

CA   WO 2010085877   *   8/2010   ............... G01S 1/00
EP   2587347 A2   5/2013
(Continued)

OTHER PUBLICATIONS

IN Appln. No. 201937035507, First Examination Report, dated Jan. 7, 2022, 7 pg.
(Continued)

*Primary Examiner* — Patrick N Edouard
*Assistant Examiner* — Eboni N Giles
(74) *Attorney, Agent, or Firm* — Cuenot, Forsythe & Kim, LLC

(57) ABSTRACT

Radar-based sensing includes, at an electronic device that includes one or more radar-based transmitters and one or more radar-based receivers, transmitting, from one or more of the radar-based transmitters, radio waves into an area in a vicinity of the electronic device and receiving, at one or more of the radar-based receivers, radio waves reflected off one or more objects in the vicinity of the electronic device. The radio waves, as reflected off the one or more objects, can be processed using a radar imaging module.

20 Claims, 13 Drawing Sheets

Related U.S. Application Data

(60) Provisional application No. 62/455,942, filed on Feb. 7, 2017.

(51) Int. Cl.
| | | |
|---|---|---|
| *G01S 13/87* | (2006.01) | |
| *G01S 13/88* | (2006.01) | |
| *G06F 3/01* | (2006.01) | |
| *G06F 3/041* | (2006.01) | |
| *G06F 3/046* | (2006.01) | |
| *G06V 40/20* | (2022.01) | |

(52) U.S. Cl.
CPC ............. *G06F 3/017* (2013.01); *G06F 3/041* (2013.01); *G06F 3/04166* (2019.05); *G06F 3/046* (2013.01); *G06V 40/28* (2022.01); *G06F 2203/04104* (2013.01); *G06F 2203/04108* (2013.01)

(58) Field of Classification Search
CPC ........... G06F 3/046; G06F 2203/04104; G06F 2203/04108; G06V 40/28
See application file for complete search history.

(56) References Cited

U.S. PATENT DOCUMENTS

| | | | |
|---|---|---|---|
| 9,389,690 | B2 | 7/2016 | Li et al. |
| 9,544,679 | B2 | 1/2017 | Trestain et al. |
| 10,088,908 | B1 | 10/2018 | Poupyrev et al. |
| 10,310,620 | B2* | 6/2019 | Lien ........................ G01S 7/354 |
| 10,310,621 | B1 | 6/2019 | Lien et al. |
| 10,514,256 | B1 | 12/2019 | Kamarshi et al. |
| 10,572,027 | B2* | 2/2020 | Poupyrev .............. G06F 1/1684 |
| 11,243,293 | B2 | 2/2022 | Avila et al. |
| 2006/0022866 | A1 | 2/2006 | Walton et al. |
| 2010/0295781 | A1* | 11/2010 | Alameh ................. G06F 3/0346 345/158 |
| 2011/0181510 | A1 | 7/2011 | Hakala et al. |
| 2012/0001787 | A1 | 1/2012 | Van Dorp |
| 2012/0093360 | A1 | 4/2012 | Subramanian et al. |
| 2012/0094594 | A1 | 4/2012 | Rofougaran et al. |
| 2012/0218228 | A1 | 8/2012 | Payne |
| 2013/0058565 | A1 | 3/2013 | Rafii et al. |
| 2013/0278503 | A1 | 10/2013 | Hirata |
| 2015/0009062 | A1 | 1/2015 | Herthan |
| 2015/0078595 | A1 | 3/2015 | Shintani |
| 2015/0277569 | A1 | 10/2015 | Sprenger et al. |
| 2015/0309154 | A1 | 10/2015 | Lohbihler |
| 2016/0041617 | A1 | 2/2016 | Poupyrev |
| 2016/0041618 | A1 | 2/2016 | Poupyrev |
| 2016/0252607 | A1 | 9/2016 | Saboo et al. |
| 2016/0259037 | A1* | 9/2016 | Molchanov ........... G01S 7/0233 |
| 2016/0320853 | A1 | 11/2016 | Lien et al. |
| 2017/0086256 | A1* | 3/2017 | Chen ..................... H04W 84/14 |
| 2017/0097413 | A1* | 4/2017 | Gillian ................ G06F 21/6245 |
| 2017/0168595 | A1* | 6/2017 | Sakaguchi ............ G06F 1/1694 |
| 2017/0192523 | A1 | 7/2017 | Poupyrev |
| 2018/0157330 | A1 | 6/2018 | Gu et al. |
| 2018/0224980 | A1 | 8/2018 | Avila et al. |
| 2019/0011989 | A1* | 1/2019 | Schwesig ................ A63F 13/21 |
| 2019/0232156 | A1 | 8/2019 | Amihood et al. |

FOREIGN PATENT DOCUMENTS

| | | |
|---|---|---|
| EP | 3577543 A1 | 12/2019 |
| KR | 20130045222 A | 5/2013 |
| KR | 20140140014 A | 12/2014 |
| KR | 20150004280 A | 1/2015 |
| KR | 20160087049 A | 7/2016 |
| KR | 101663027 B1 | 9/2016 |
| KR | 20160128318 A | 11/2016 |
| KR | 20190107047 A1 | 9/2019 |
| WO | 2016053744 A1 | 4/2016 |
| WO | 2018147646 A1 | 8/2018 |

OTHER PUBLICATIONS

EP Appln. No. EP18751907.9, (PCT/KR2018/001668) Supplementary EP Search Report, dated Apr. 29, 2020, 13 pg.
EP Appln. No. EP18751907.9, (PCT/KR2018/001668) Supplementary Partial EP Search Report, dated Dec. 18, 2019, 14 pg.
WIPO Appln. No. PCT/KR2018/001668, Inlemational Preliminary Report on Patentability and Written Opinion, dated Aug. 13, 2019, 9 pg.
WIPO Appln. No. PCT/KR2018/001668, International Search Report, dated May 29, 2018, 3 pg.
KR Appln. KR20197022313A, Office Action (original and translation), May 30, 2022, 13 Pg.
KR Appln. No. 20197022313A, Notice of Patent Grant, dated Feb. 8, 2023, 6 pg.

* cited by examiner

500
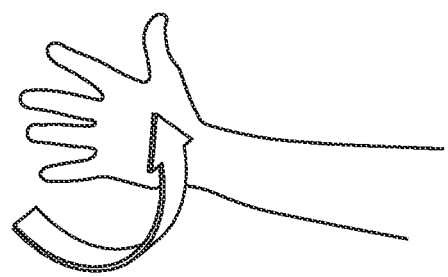
Hand Orientation
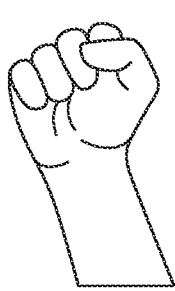 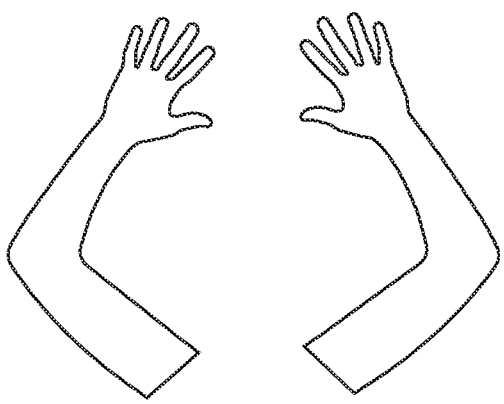 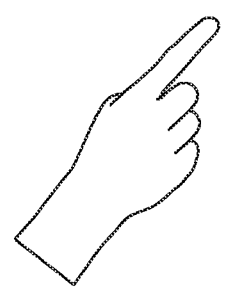
Hand Pose        Arm Pose        Finger Pose
*FIG. 5*

1100
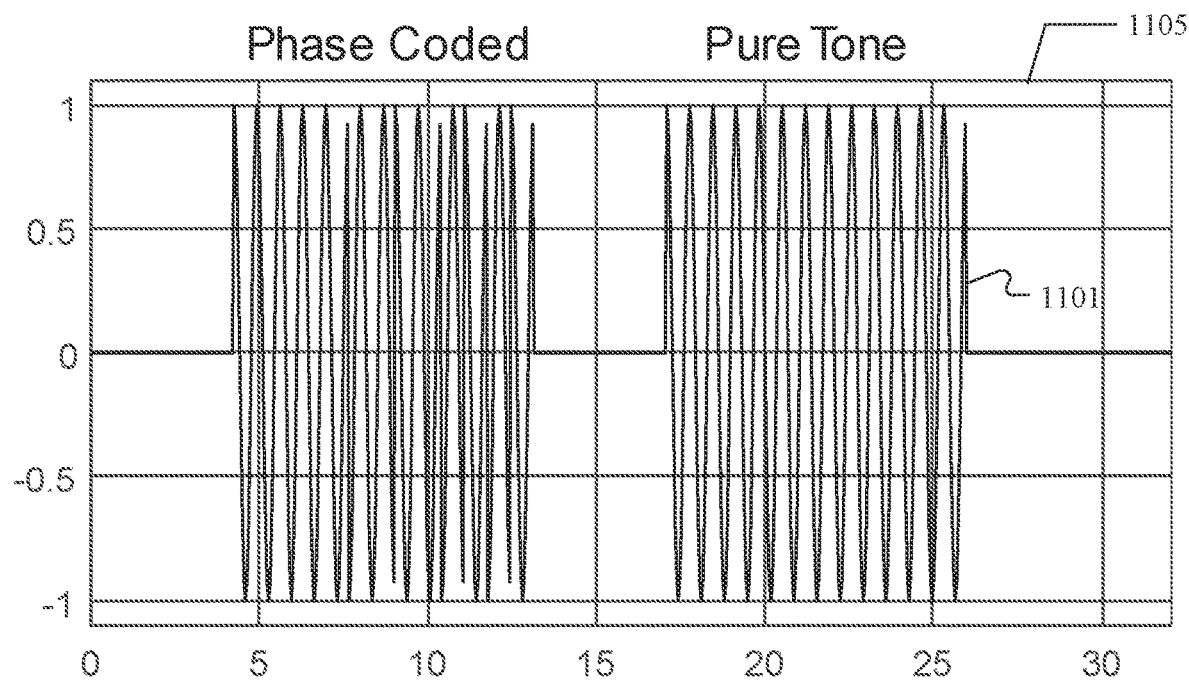
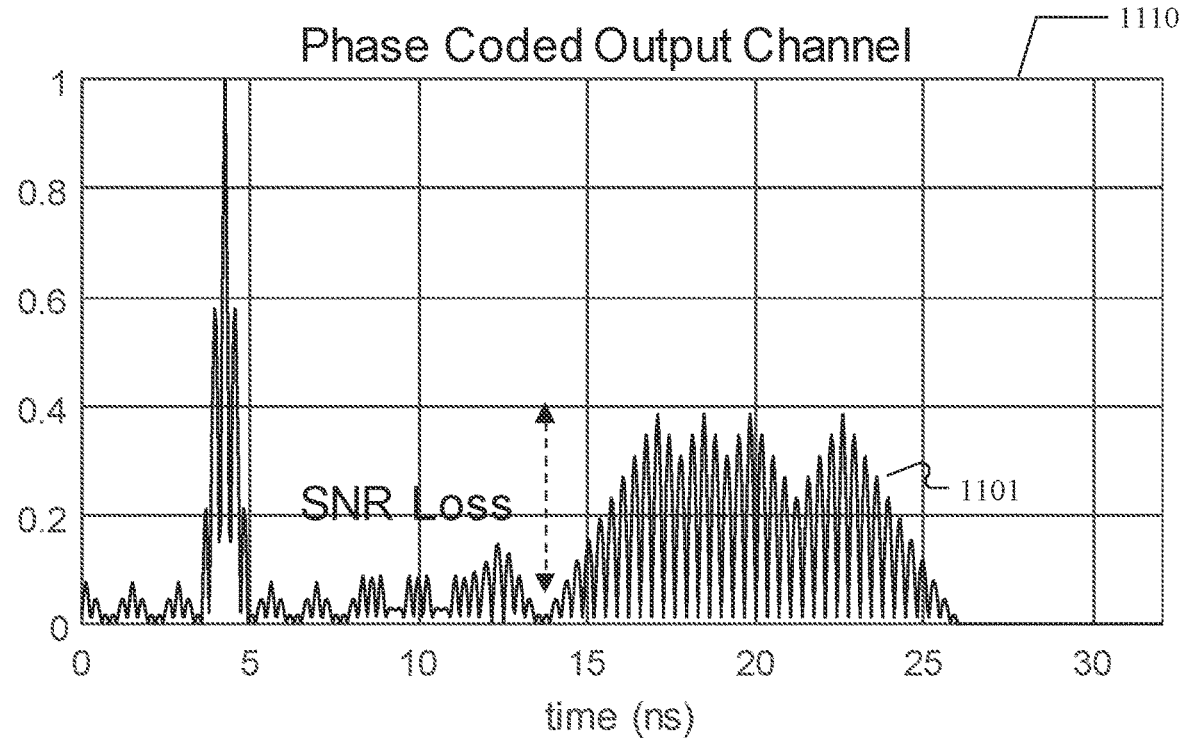
*FIG. 11*

1200

1210 — At an electronic device that includes a plurality of radar-based transmitters and one or more radar-based receivers, select, based on one or more preferences for detecting one or more objects in the vicinity of the electronic device, a transmission operating mode for the plurality of transmitters 1220 — At an electronic device that includes a plurality of radar-based transmitters and one or more radar-based receivers, transmit, from at least some of the plurality of transmitters in accordance with the transmission operating mode, radio waves into an area in the vicinity of the electronic device 1230 — At an electronic device that includes a plurality of radar-based transmitters and one or more radar-based receivers, activate the one or more receivers to detect radio waves reflected off one or more objects in the vicinity of the electronic device

*FIG. 12*

RADAR-BASED SYSTEM FOR SENSING TOUCH AND IN-THE-AIR INTERACTIONS

RELATED APPLICATION

This application claims the benefit, under 35 U.S.C. § 119(e), of U.S. Provisional Patent Application No. 62/455,942 filed 7 Feb. 2017, which is incorporated herein by reference.

TECHNICAL FIELD

This disclosure generally relates to electronic detection of an object.

BACKGROUND

Users may interact with electronic devices in different ways. For example, a controller, such as a mouse, or an operation panel may traditionally be used to interact with an electronic device. Touch interactions or in-the-air gesture interactions are increasingly used to interact with electronic devices. Compared to the traditional controller or operation panel, touch or in-the-air interactions may increase interaction space, freedom, convenience, intuitiveness, etc. for users operating smart devices and electronic systems.

Touch or in-the-air gesture interactions are typically accomplished through resistive, capacitive, surface acoustic wave, camera or infrared technologies. However, there are downsides to using these technologies for touch or in-the-air gesture interaction systems. For example, these technologies are not robust to changes in lighting conditions, may be susceptible to hacking or spoofing, and/or require considerable processing power and cost.

BRIEF DESCRIPTION OF THE DRAWINGS

FIG. 5 illustrates a plurality of example gestures that can be detected by radar imaging.

FIG. 11 illustrates an example processing of a radio wave by phase coding.

FIG. 12 illustrates an example method for operating a radar-based sensing system in several transmission operating modes.

DESCRIPTION OF EXAMPLE EMBODIMENTS

Figure 1:
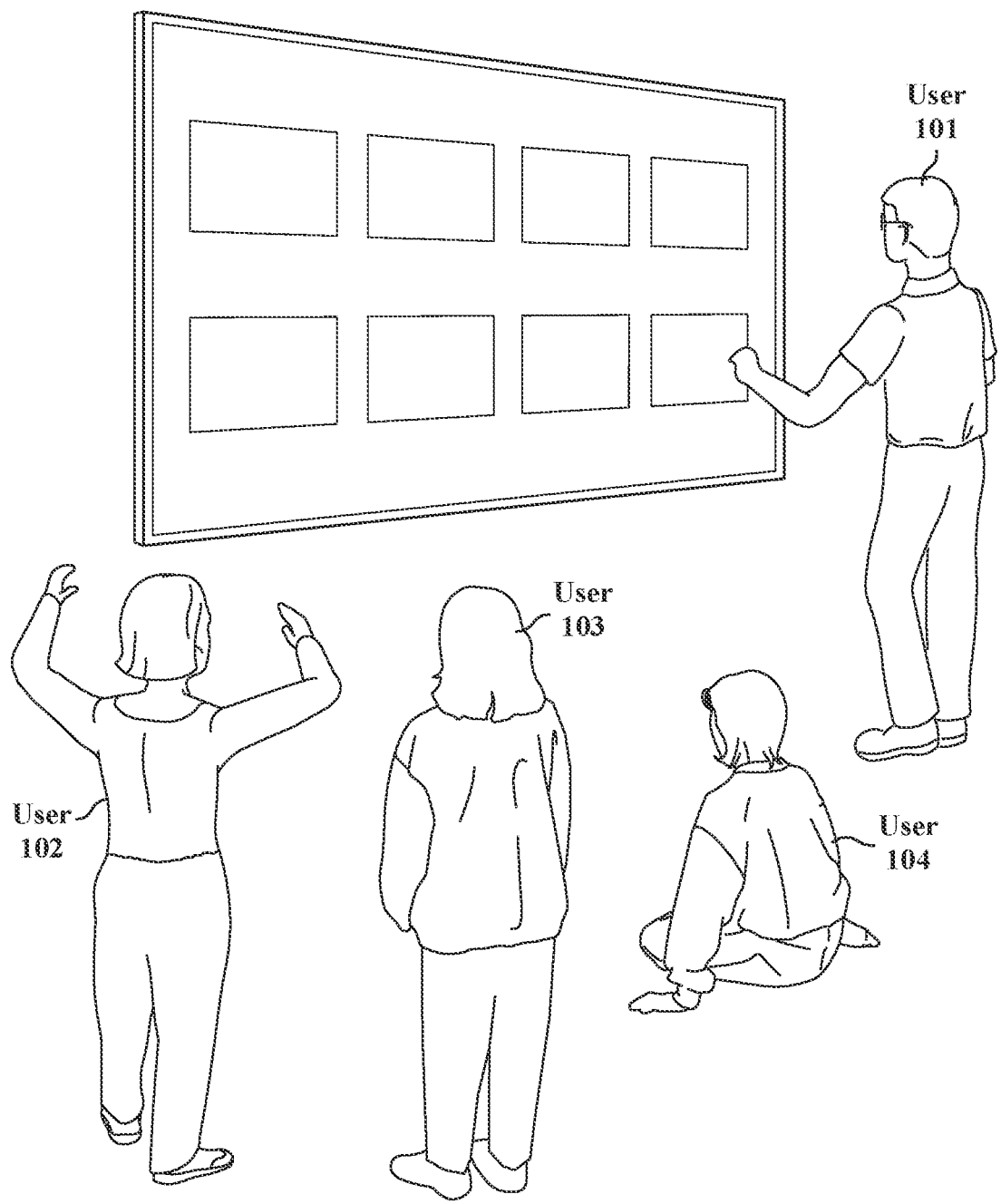
FIG. 1 illustrates an example radar-based sensing system for detecting touch and in-the-air interactions.

Radar, an abbreviation for "radio detection and ranging," is an object detection system that uses radio waves (electromagnetic waves between 3 MHz and 120 GHz) to determine range, velocity, angular direction, size and shape of objects. In a radar system, a transmitter emits radio waves, which are reflected, scattered or absorbed when they come into contact with an object. Radio waves reflected or scattered towards a receiver (echo signals) are then processed to determine range, velocity, angular direction, size, shape, or other features of the object.

The radar-based sensing system described herein uses radio waves to detect user interactions with an electronic device. In some embodiments, the radar-based sensing system may detect touch-gesture interactions when users are close to the radar-based sensing system. In some embodiments, the radar-based sensing system may detect in-the-air gesture interactions when users are away from the radar-based sensing system. For example, users may be 1 feet, 30 feet, or any distance between 1 feet and 30 feet, away from the radar-based sensing system. To achieve such functionality, the radar-based sensing system may dispose transmitters that transmit radio waves at different angles (e.g., inward and outward) with respect to the system.

In particular embodiments, the radar-based sensing system may select from a number of different operating modes to transmit radio waves to fulfill different requirements (e.g., low resolution, high resolution, high frame rate, etc.). In particular embodiments, a radar-based sensing system may use different data processing modules (e.g., trilateration and radar imaging) for different applications (e.g., simple gesture recognition, complex gesture recognition, scene analysis, etc.). In particular embodiments, a radar-based sensing system may dynamically switch between different transmission operating modes or different data processing modules. In particular embodiments, the radar-based sensing system disclosed herein can satisfy a broad range of requirements (such as imaging or object tracking requirements) by selecting a particular combination of transmitters, data processing modules, and transmission operating modes. For example, by dynamically selecting the appropriate transmission operating mode and/or data processing module, the radar-based sensing system may provide near-field, simple gesture recognition in a noisy environment; yet when higher resolution is required, the system may also provide far-field, complex gesture recognition by selecting a different transmission operating mode and/or data processing module (or both).

Particular embodiments of the radar-based sensing system described herein may operate even when there is limited visible light or when smoke, steam, fog, snow, rain, etc. are present. Particular embodiments of the radar-based sensing system described herein may detect in-the-air interactions through materials such as walls or glass. Thus, particular embodiments permit concealed installation of the radar-based sensing system. For example, the system may be installed behind walls, covers, etc. In other embodiments, the radar-based sensing system may be used in public displays, e.g., through-window store interactive displays.

The radar-based sensing system described herein may replace or complement capacitive touch. For example, capacitive touch sensors may be expensive in large display, and thus radar-based sensing systems become more economical. The radar-based sensing system described herein may also improve user privacy and be capable of nighttime operation because no cameras are required.

Particular embodiments of the radar-based sensing system described herein may allow both touch and in-the-air interactions and may allow users to be far away from the system during in-the-air interactions. Hence, the radar-based sensing system may be used in TVs, projectors, car control systems that use gestures for operation, home appliances such as sounds systems and kitchen appliances, and interactive gaming, etc. For example, a radar-based sensing system may be used in in-home presence sensing and/or tracking (e.g., from a TV or sound bar), which may be used to achieve more effective advertisement delivery. Particular embodiments of the radar-based sensing system described herein may require relatively little processing power and low cost to manufacture. Consequently, the radar-based sensing system may be used in compact consumer products such as smart phones, tablets, wearable devices, VR/AR headsets, etc. Particular embodiments of the radar-based sensing system described herein may be used in a variety of other scenarios. Although this disclosure describes and illustrates particular use cases of the radar-based sensing system, this disclosure contemplates any suitable use cases of the radar-based sensing system described herein.

FIG. 1 illustrates an example radar-based sensing system for detecting touch and in-the-air interactions. As an example and not by way of limitation, the radar-based sensing system may detect that user 101 interacts with the system by touching the system. User 101 may perform different touch gestures as a way of instructing the system to implement different functions. Correspondingly, the radar-based sensing system may identify these touch gestures and implement the different functions. As another example and not by way of limitation, the radar-based sensing system may detect that user 102 interacts with the system via in-the-air gestures. User 102 may perform different in-the-air gestures as a way of instructing the system to implement functions. Correspondingly, the radar-based sensing system may identify these in-the-air gestures and implement the appropriate functions. As another example and not by way of limitation, the radar-based sensing system may detect that user 103 stands in front of the system. The radar-based sensing system may determine the height, size, location, posture, or other attributes of user 103. As another example and not by way of limitation, the radar-based sensing system may detect that user 104 is sitting in front of the system. The radar-based sensing system may determine the sitting position and location of user 104, among other features. Although this disclosure illustrates particular scenarios of a particular radar-based sensing system for detecting particular interactions, this disclosure contemplates any suitable scenarios of any suitable radar-based sensing systems for detecting any suitable interactions in any suitable manner.

Figure 2:
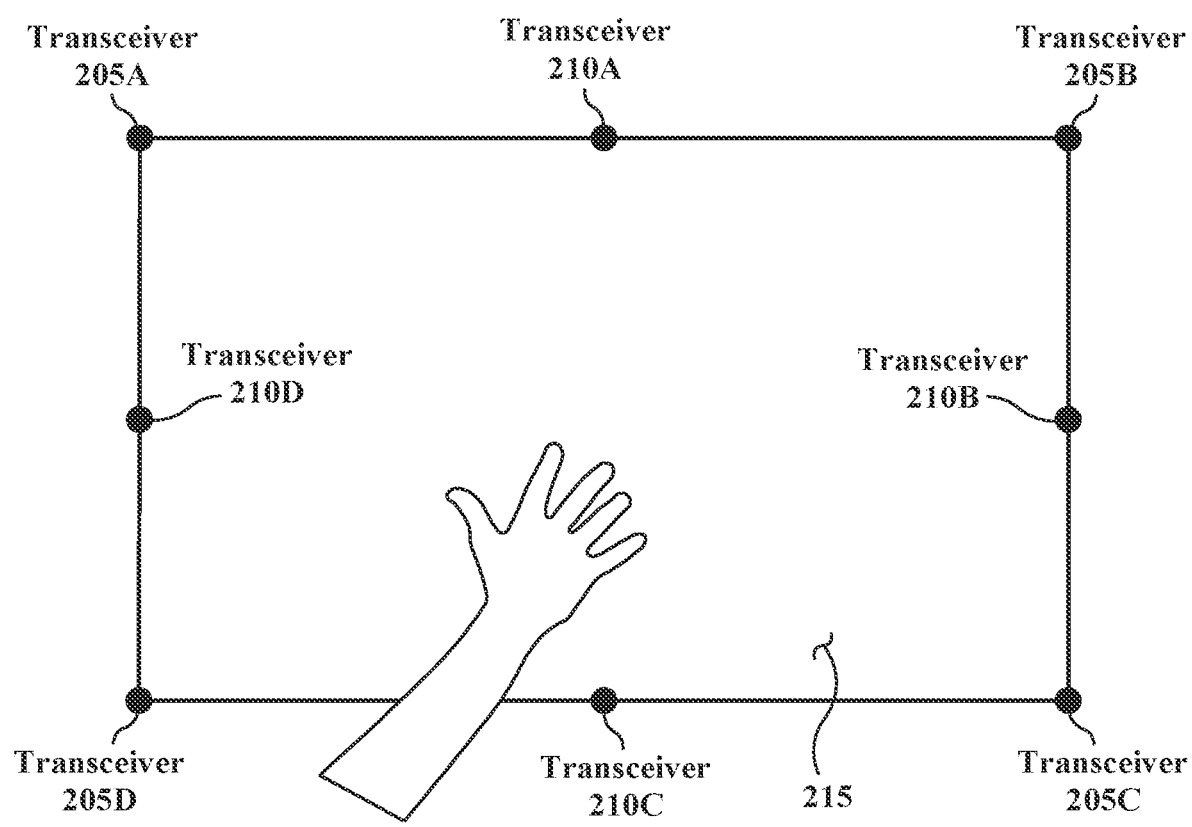
FIG. 2 illustrates an example radar-based sensing system deployed on a device equipped with a display.

FIG. 2 illustrates an example prototype of a radar-based sensing system 200 deployed on a device equipped with a display 215. In particular embodiments, the radar-based sensing system 200 may include a plurality of radar transceivers 205 and a plurality of radar transceivers 210. As an example and not by way of limitation, the radar-based sensing system 200 in FIG. 2 may include four transceivers 205 (i.e., 205A-205D) and four transceivers 210 (i.e., 210A-210D). In particular embodiments, each of the plurality of radar transceivers 205 or radar transceivers 210 may include one or more radar transmitters and one or more radar receivers. The one or more radar transmitters may transmit radio waves into an area in the vicinity of the radar-based sensing system 200. In particular embodiments, the vicinity of the radar-based sensing system 200 may include the area near or surrounding the radar-based sensing system 200. For example, the vicinity may be the area within a 2-foot radius of the radar-based sensing system 200. As another example, the vicinity may be the area within a 30-foot radius of the radar-based sensing system 200. As another example, the vicinity may be the area within a 15-foot radius of the radar-based sensing system 200. As another example, the vicinity may be a region within which the transceivers are capable of radiating radio waves above a certain power or energy threshold. In particular embodiments, the power or energy threshold may depend on the noise present in received radio waves. This disclosure contemplates that a vicinity may take any suitable shape, such as a circular or rectangular shape. In particular embodiments, the vicinity of a radar-based sensing system may depend on the particular application or implementation of the system. For example, if a radar-based sensing system is used to detect interaction with a small store display, such as interaction with a particular smart phone in a row of smart phones, then the vicinity may be 2 feet or less. As another example, if a radar-based sensing system is used in a large display, such as a TV in a user's living room, then the vicinity of the radar-based sensing system may be around 15 feet from the radar-based sensing system.

The one or more radar receivers may receive radio waves reflected off one or more objects in the vicinity of the radar-based sensing system 200. In other embodiments, the one or more radar receivers may receive radio waves scattered by one or more objects in the vicinity of the radar-based sensing system 200. In particular embodiments, the plurality of radar transceivers 205 and the plurality of radar transceivers 210 may be disposed on a substantially rectangular edge of the radar-based sensing system 200 surrounding the display 215. As an example and not by way of limitation, transceivers 205A-205D in FIG. 2 may be disposed in the corners of the substantially rectangular edge surrounding the display 215 and transceivers 210A-210D in FIG. 2 may be disposed in between the corners of the substantially rectangular edge surrounding the display 215. Although this disclosure describes disposing transceivers at the edges of a display, transceivers may be disposed in any suitable way that radio waves can reach users and radar-based sensing systems can detect user gesture interactions.

In particular embodiments, the radar-based sensing system 200 may also include one or more non-transitory storage media embodying instructions. In particular embodiments, the radar-based sensing system 200 may additionally include one or more processors. The one or more processors may be operable to execute the instructions to detect user gesture interactions. While this disclosure describes various aspects of transmitters and receivers within a transceiver, this disclosure contemplates that those components may by implemented in a radar-based sensing system separately from a transceiver, that a transceiver may include only some of those components, and/or that a transceiver may include additional components of the radar-based sensing system.

Figure 3:
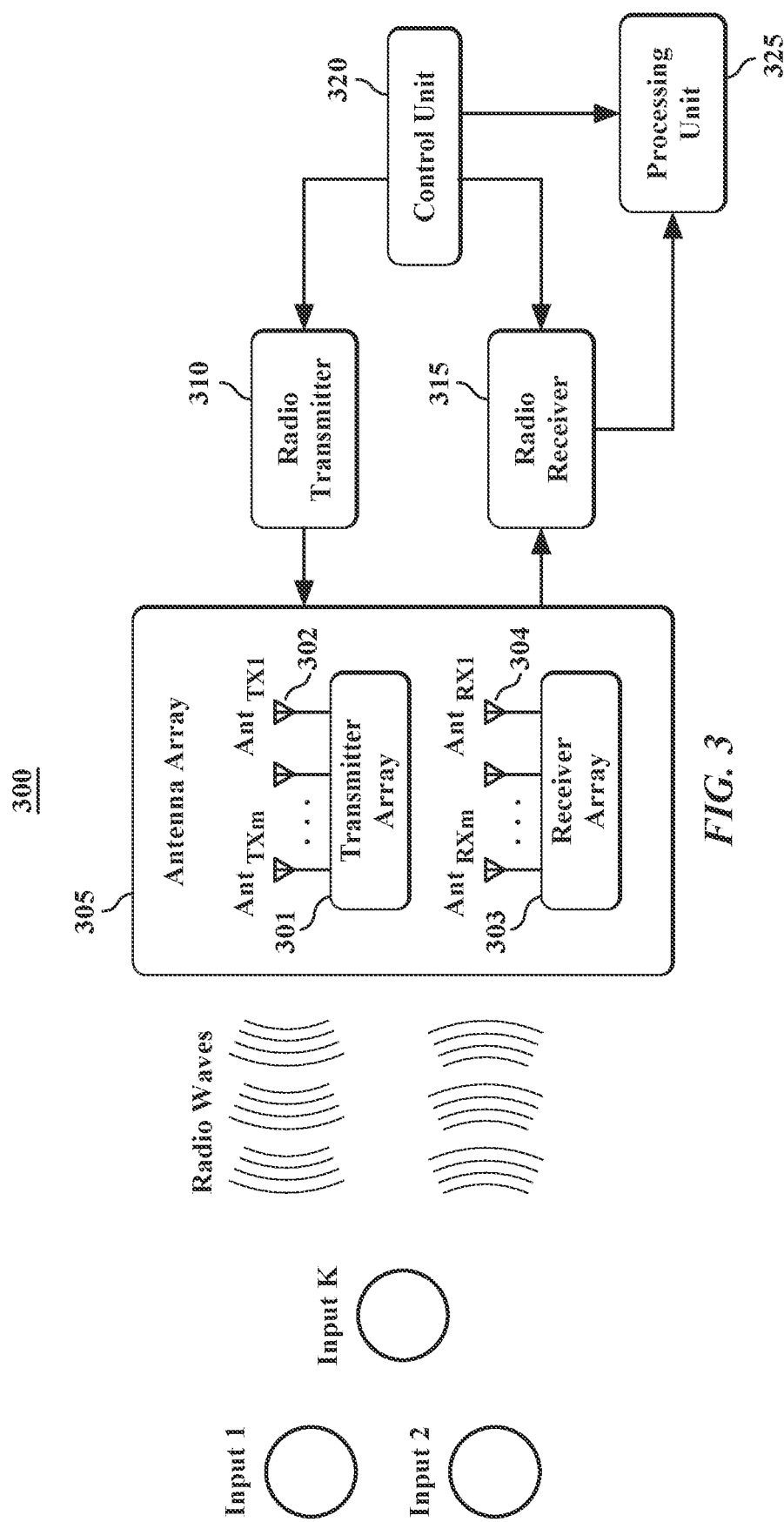
FIG. 3 illustrates example hardware of a radar-based sensing system.

FIG. 3 illustrates example hardware of a radar-based sensing system, such as the radar-based sensing system 200. In FIG. 3, the radar-based sensing system may include an antenna array 305, a radio transmitter 310, a radio receiver 315, a control unit 320, and a processing unit 325. The antenna array 305 may include a transmitter array 301 integrating one or more antennas 302. The antenna array 305 may also include a receiver array 303 integrating one or more antennas 304. To detect interactions from users based on user input, the radar-based sensing system may implement a transmission mode and a reception mode. In transmission mode, radio transmitter 310 may supply an electric current oscillating at radio frequency (3 MHz to 120 GHz) to transmitter array 301. The antennas 302 of transmitter array 301 may then radiate energy from the electric current as radio waves. The radio waves may reach objects, such as users, and be reflected back to the radar-based sensing system. The radar-based sensing system may then operate in receiving mode. In receiving mode, the antennas 304 of the receiver array 303 may detect the reflected radio waves. The antennas 304 may further produce a voltage and provide the voltage to the radio receiver 315. The radio receiver 315 may then amplify the voltage and send the amplified voltage to the processing unit 325. The processing unit 325 may then detect the gesture interactions based on the amplified voltage. The control unit 320 may control the radio transmitter 310 for electric current generation and the radio receiver 315 for voltage amplification. The control unit 320 and processing unit 325 may communicate with each other to detect gesture interactions. Although this disclosure illustrates a particular hardware of a radar-based sensing system, this disclosure contemplates any suitable hardware of the radar-based sensing system.

In particular embodiments, a radar-based sensing system may transmit different types of radio waves in different ways. In particular embodiments, a radar-based sensing system may transmit radio waves as high-frequency impulse signals having relatively high power. After transmitting one high-frequency impulse signal of high power, the radar-based sensing system may cease transmission to receive the reflected signal. Once the reflected signal is received, the radar-based sensing system may transmit another high-frequency impulse signal. The radar-based sensing system may determine a direction, distance, height, and/or altitude of an object based on a measured antenna position and a propagation time of the impulse signals. In particular embodiments, a radar-based sensing system may continuously transmit radio waves using high-frequency signals. As an example, the signals may be constant in amplitude and frequency. A radar-based sensing system may use such signals for measuring a speed of the target user. As another example, the signals may be constant in amplitude but modulated in frequency. The radar-based sensing system 200 may use such signals for measuring a distance of an object from the system.

Figure 4:
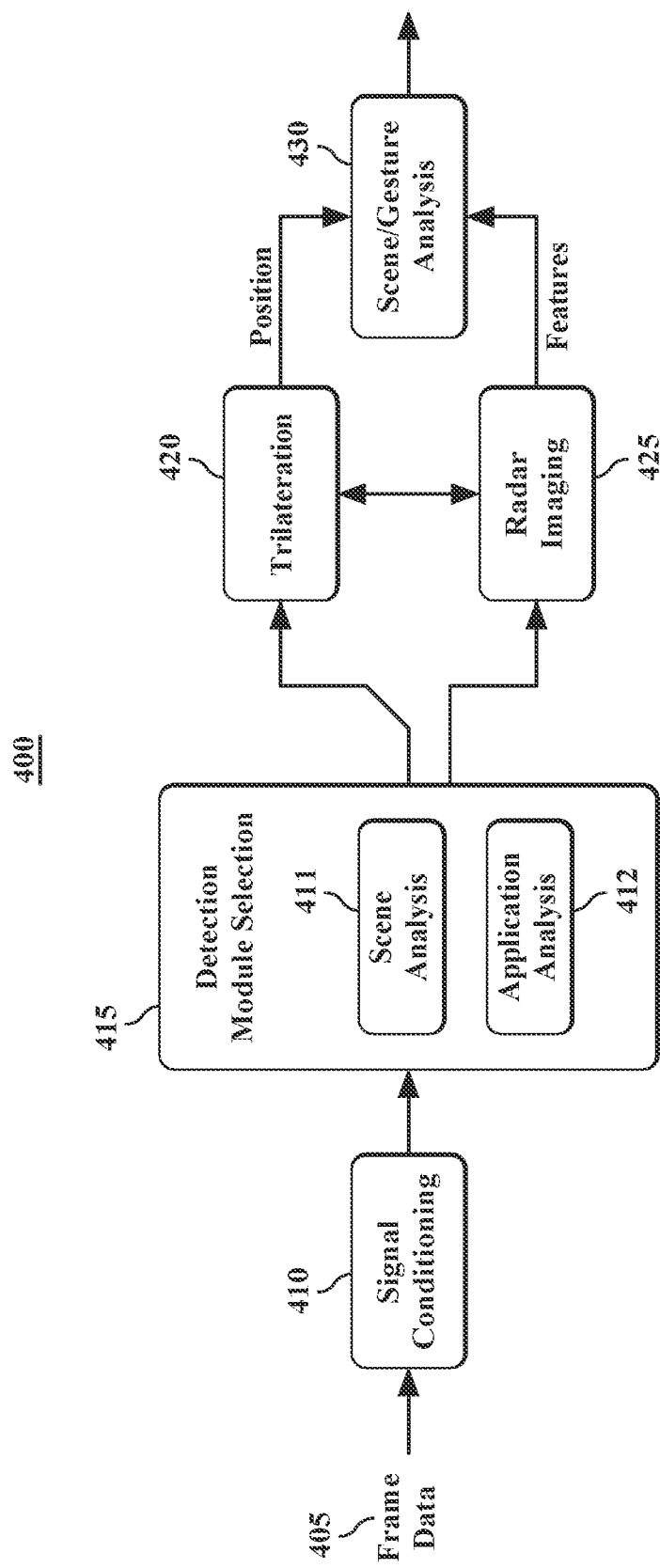
FIG. 4 illustrates an example processing flow implemented by an example radar-based sensing system for scene and gesture analysis.

FIG. 4 illustrates an example processing flow 400 implemented by an example radar-based sensing system for scene and gesture analysis. The processing flow may use data from the transmitter array 301 and the receiver array 303. In particular embodiments, the transmitter array 301 and the receiver array 303 may be operated in monostatic configuration. In other embodiments, the transmitter array 301 and the receiver array 303 may be operated in bistatic (MIMO) configuration. In particular embodiments, a radar-based sensing system may use Signal Conditioning 410 to process Frame Data 405 from the transmitter array 301 and the receiver array 303. For example, Signal Conditioning 410 may remove noise from received radar signals. After Frame Data 405 is processed, the radar-based sensing system may use Detection Module Selection 415 to determine whether to select Trilateration Module 420 or to select Radar Imaging Module 425 to process the data. In particular embodiments, the determination may be based on Scene Analysis 411 and Application Analysis 412, described more fully below.

In particular embodiments, Trilateration Module 420 may estimate one or more positions of one or more objects (e.g., users) that are in the vicinity of the radar-based sensing system. The estimated positions may be then input to Scene/Gesture Analysis Module 430 to detect different scenes or gestures. In particular embodiments, Radar Imaging Module 425 may estimate a plurality of features of the one or more objects (e.g., users) in the vicinity of the radar-based sensing system. The plurality of features may include size, position, orientation, and height. The estimated features may be then input to Scene/Gesture Analysis Module 430 to detect different scenes or gestures. In particular embodiments, Radar Imaging Module 425 may use the estimated positions of the one or more objects (e.g., users) by Trilateration Module 420 to reduce the probability of detecting false objects (e.g., users). In other embodiments, Trilateration Module 420 may use the detection results of Radar Imaging Module 425 to improve the estimation of the positions of the objects (e.g., users).

In particular embodiments, Detection Module Selection 415 may select between Trilateration Module 420 and Radar Imaging Module 425 based on one or more interactions requirements specified by an application or process using the interaction data. This disclosure contemplates that applications may be specified by a standalone application or by a process internal to, e.g., an operating system executing on the device the user is interacting with. As one example, Application Analysis Module 412 may identify one or more application requirements for processing user interactions with a radar-based sensing system. In particular embodiments, Detection Module Selection 415 may select Radar Imaging Module 425 when the one or more requirements include tracking the one or more objects, determining a distance between the one or more objects and the radar-based sensing system, determining a shape of the one or more objects, and/or determining a size of the one or more objects. In particular embodiments, Detection Module Selection 415 may select Trilateration Module 420 when the one or more requirements include processing received radio waves at a frame rate that exceeds a threshold frame rate. As an example and not by way of limitation, user interactions (such as hand movements) during a game may require high frame rate. The radar-based sensing system may therefore select Trilateration Module 420 to process user interactions.

In particular embodiments, Detection Module Selection 415 may select Radar Imaging Module 425 when one or more interaction requirements include determining an orientation of the one or more objects. As an example and not by way of limitation, the one or more objects may include a hand or limb of a user. As another example and not by way of limitation, the one or more objects may include a plurality of fingers of a user. An application, such as a drawing or game application, may require detecting the orientation of individual fingers, and thus Radar Imaging Module 420 may be used to process user interactions. In particular embodiments, Detection Module Selection 415 may select Radar Imaging Module 425 when the one or more requirements include identifying at least some of the one or more objects. As explained more fully below, the Detection Module Selection 415 may determine a set of the identified objects on which to focus further processing based on Scene Analysis Module 411, which may identify detection requirements based on application requirements and, perhaps, environmental conditions. For example, an application may require that only users' hands be tracked, and Scene Analysis Module 411 may determine whether detecting user's hands in the area of the radar-based system requires using Trilateration Module 420 or Radar Imaging Module 425.

Detection Module Selection 415 may determine the selection between Trilateration Module 420 and Radar Imaging Module 425 based on a variety of conditions. In particular embodiments, Detection Module Selection 415 may select Trilateration Module 420 when a speed of at least one of the one or more objects being tracked exceeds a predetermined threshold. In particular embodiments, Detection Module Selection 415 may select Trilateration Module 420 when the position of an object being tracked corresponds to a position of a cursor displayed on the display 215 of the radar-based sensing system 200. In particular embodiments, it may be beneficial to use Trilateration Module 420 to process frame data 405. Benefits to using Trilateration Module 420 instead of Radar Imaging Module 425 may include faster data processing to detect gesture interactions efficiently, less sensitivity to timing errors, higher frame-rate processing of data, and precise localization of objects in the vicinity of the radar-based sensing system.

In other embodiments, it may be beneficial to use Radar Imaging Module 425 rather than Trilateration Module 420 to process frame data 405. For example, Detection Module Selection 415 may select Radar Imaging Module 425 if a scene needs to be analyzed in detail. Radar Imaging Module 425 may form a 3D image representing the scene. The 3D image may be then input to the module of Scene/Gesture Analysis 430 for scene analysis. As an example and not by way of limitation, the module of Scene/Gesture Analysis 430 may analyze the size, position, posture, etc. of one or more users—or of a portion (such as arm and hand) of one or more users—and decide what part of the scene to analyze or track. In particular embodiments, Detection Module Selection 415 may select Radar Imaging Module 425 when noise associated with the received radio waves exceeds a predetermined threshold. For example, Trilateration Module 420 may fail to adequately identify a target object when noise is present, even if only a simple position of the target object is needed. In this case, a radar-based sensing system may select Radar Imaging Module 425 to analyze the scene. Once a target region containing the object is identified, the radar-based sensing system may focus on the corresponding portion of the signal to avoid noisy regions and improve the accuracy of Trilateration Module 420. In particular embodiments, a radar-based sensing system may dynamically select partial imaging regions for Radar Imaging Module 425 to analyze in order to increase the efficiency.

In particular embodiments, Frame Data 405 may include one or more temporally sequential frames. Detection Module Selection 415 may dynamically determine, for each frame or for a number of frames, whether to process the frame(s) by using Trilateration Module 420 or Radar Imaging Module 425. In particular embodiments, the dynamic determination may be made based on application and scene requirements, such as those described above. As an example and not by way of limitation, an application's interaction detection requirements may change at different points in the flow of user experience (UX). For example, in the main menu of the application, a simple cursor may be sufficient to interact with the application. Thus, because the application only requires the user to control a position of a cursor, Detection Module Selection 415 may select Trilateration Module 420. In the main program, the application may require operation based on complex gestures. For example, the complex gestures may include selecting sub-menu items with fingers, rotating a graphical object with hand orientation, or controlling graphical objects or characters in a game. As a result, Detection Module Selection 415 may select Radar Imaging Module 425 to process those more complex interactions. During the main program, a user may have the option to select another menu (a menu different from the main menu). Therefore, the application once again may only require a user to specify a position of a cursor. Detection Module Selection 415 may accordingly select Trilateration Module 420 for the frame data corresponding to interaction with the main menu. Detection Module Selection 415 may select Radar Imaging Module 425 again when the application requires complex gesture detection. As another example and not by way of limitation, an application may require scene analysis followed by simple tracking. For example, an IOT (internet of things) application of a TV may initially analyze a scene using Radar Imaging Module 425 to understand the position, size, or posture of users or a particular room layout. Once scene analysis is completed, the application may decide to track certain users or portions of users, such as hands. Depending on the circumstances, Radar Imaging Module 425 may be selected again to determine which user should be the target. After the target is determined, the application may only require simple positions of the target so Trilateration Module 420 may be selected. Thus, as explained above and elsewhere herein, Detection Module Selection 415 may select the appropriate processing module on a frame-by-frame basis, on a conditional basis (e.g., as application requirements change), as part of an initialization process, or any suitable combination thereof.

In particular embodiments, Radar Imaging Module 425 may coherently or incoherently combine data from the plurality of radar transceivers 205 and the plurality of radar transceivers 210 to form a 2D or 3D image over a user defined image space. In particular embodiments, each radar transceiver 205 or radar transceiver 210 may be programmed and reconfigured as either a transmitter or receiver and each of them may return one-dimensional data. In particular embodiments, Radar Imaging Module 425 may use one or more imaging algorithms to form images from frame data 405. The one or more imaging algorithms may include a back-projection algorithm and a MIMO range migration algorithm.

In particular embodiments, Radar Imaging Module 425 may use a back-projection algorithm. For example, frame data 405 may be first filtered using a low pass filter. Then the back-projection algorithm may choose to compute the envelope of the filtered data or not corresponding to incoherent processing or coherent processing, respectively. For incoherent processing, the envelope of the filtered data may be computed, retaining only the signal amplitude. Incoherent processing may be less susceptible to calibration errors but it may give a lower resolution image. For coherent processing, the envelope may be not computed and the signal may be left at the carrier frequency. As a result, the phase information of the signal may be retained. In particular embodiments, Radar Imaging Module 425 may then form a 2D or 3D image based on a pre-defined imaging space. The pre-defined imaging space may be a plane with discrete coordinates or a volume with discrete coordinates. The resolution and size of the imaging space may be determined as one or more functions of the array spacing of the antenna array 305, the number of transceivers 205 and transceivers 210, and the bandwidth of the radio waves. After the 2D or 3D image is formed, the positions of the one or more objects may be estimated using blob detection. The estimated positions may be used for scene/gesture analysis 430.

This disclosure contemplates that Trilateration Module 420 and Radar Imaging Module 425 may implement any suitable trilateration or imaging processing algorithms, respectively, to process frames of data. This disclosure contemplates that the algorithms may be executed by any suitable computing device, which, in many instances, will be the computing device with which the user is interacting. However, this disclosure also contemplates that such processing may be performed by a remote device, such as server device, or by a combination of devices.

FIG. 5 illustrates a plurality of example interactions that are detectable based on radar imaging 425. As an example and not by way of limitation, Radar Imaging Module 425 may detect the orientation of a hand. As another example and not by way of limitation, Radar Imaging Module 425 may detect a hand pose. As another example and not by way of limitation, Radar Imaging Module 425 may detect a pose by one arm or a pose by two arms. As another example and not by way of limitation, Radar Imaging Module 425 may detect a finger pose. Although this disclosure illustrates particular gestures detectable based on radar imaging, this disclosure contemplates any suitable gestures detectable based on radar imaging in any suitable manner.

Figure 6A:
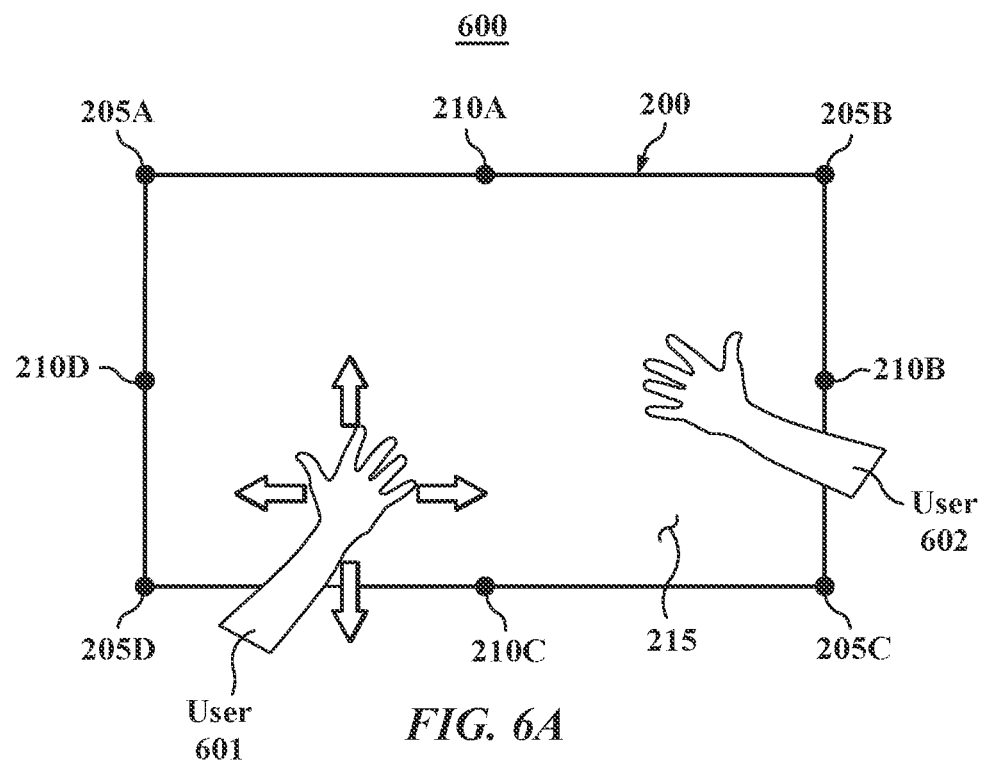
FIGS. 6A-B illustrates a plurality of example gestures that can be detected by trilateration.
Figure 6B:
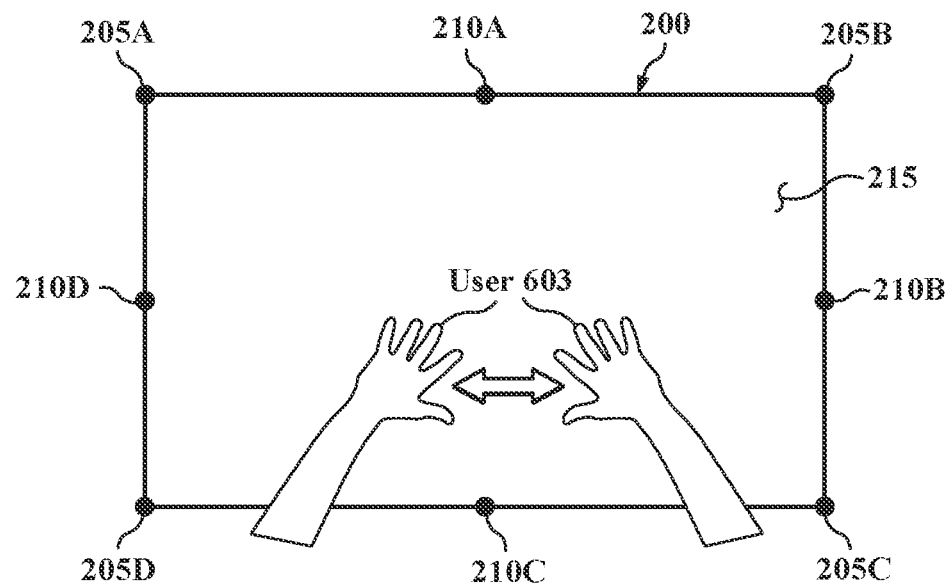

In particular embodiments, Trilateration Module 420 may estimate one or more positions of the one or more objects in the vicinity of the radar-based sensing system. For example, frame data 405 may be first filtered using a low pass filter. The envelope of the filtered data may be then computed. Trilateration Module 420 may further estimate the positions of the objects based on the computed envelope. In particular embodiments, the radar-based sensing system may further detect interactions based on the estimated positions of the objects. FIG. 6 illustrates a plurality of example interactions that are detectable based on Trilateration Module 420. As an example and not by way of limitation, the interactions may include gestures such as a swipe by a hand, a touch by a hand, or a click by a hand. The gestures may be performed by different users. For example, in FIG. 6A user 601 may perform a swipe by one hand and user 602 may perform a touch by one hand. As another example and not by way of limitation, the gestures may be performed by two hands. For example, in FIG. 6B user 603 may pinch, zoom, or rotate using two hands. In particular embodiments, Trilateration Module 420 process an object as single entity, while Radar Imaging Module 425 may detect various portions of objects and process them separately. For example, Trilateration Module 420 may detect hand of User 601 as a single object. Thus, Trilateration Module 420 may track the position of the hand regardless of what the particular fingers of the hand are doing. In contrast, Radar Imaging Module 425 may detect the position of the hand and the position(s) of individual fingers of the hand, and differentiate between the position(s).

A number of advantages result from dynamically switching between Trilateration Module 420 and Radar Imaging Module 425. One advantage may include the ability to process frames with higher frame rates and reduced processing complexity compared to imaging-only solutions. Another advantage may include smarter imaging driven by the use of Trilateration Module 420 to pinpoint sub-regions of interest, for example by quickly detecting the portions of a scene that are moving, before devoting the processing resources required to image a scene. Another advantage may include potentially using fewer antennas, for example because Trilateration Module 420 can, in some embodiments, requiring using only three antennas to track an object.

Figure 7:
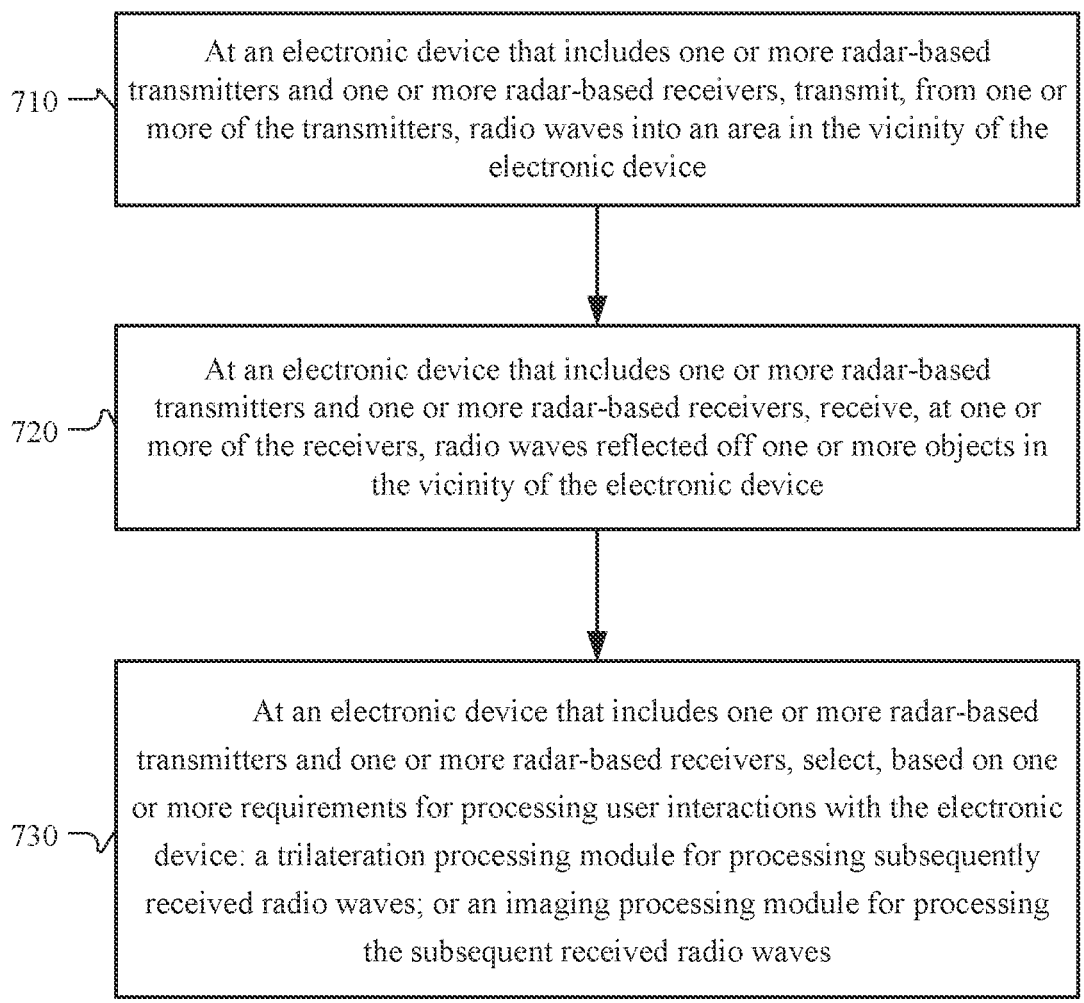
FIG. 7 illustrates an example method for selecting between trilateration and radar imaging for a radar-based sensing system.

FIG. 7 illustrates an example method 700 for selecting between Trilateration Module 420 and Radar Imaging Module 425 for a radar-based sensing system. The method may begin at step 710. At step 710, the radar-based sensing system may transmit, from one or more of the transmitters, radio waves into an area in the vicinity of the radar-based sensing system. For example, the transmitters may be integrated in the transceivers 205 or transceivers 210. At step 720, the radar-based sensing system may receive, at one or more of the receivers, radio waves reflected off one or more objects in the vicinity of the radar-based sensing system. For example, the receivers may be integrated in the transceivers 205 or transceivers 210 and the one or more objects may be one or more users. At step 730, the radar-based sensing system may select, based on one or more requirements for processing user interactions with the radar-based sensing system 200: a Trilateration Module 420 processing module for processing subsequently received radio waves; or an imaging 425 processing module for processing the subsequently received radio waves. For example, any of the requirements described above, or any suitable combination thereof, may be used to select the appropriate processing module.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for sensing an object based on electromagnetic radiation, including the particular steps of the method of FIG. 7, this disclosure contemplates any suitable method for sensing an object based on electromagnetic radiation, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
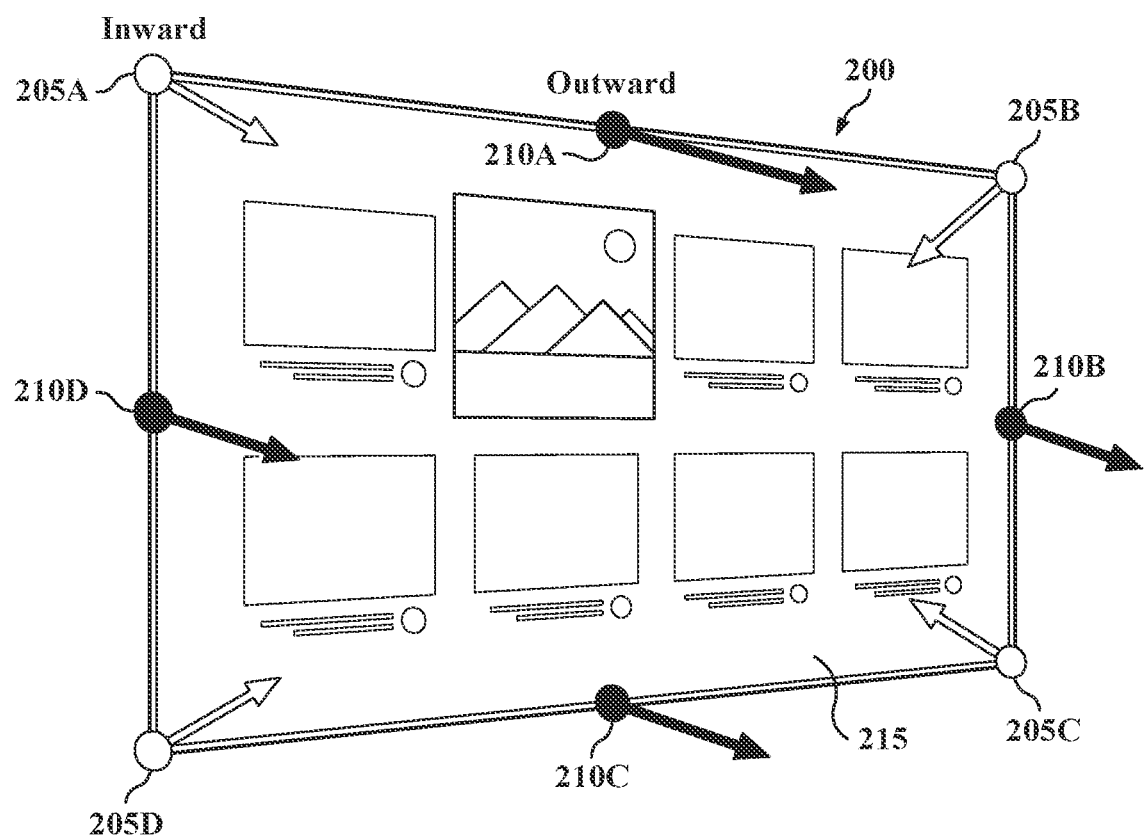
FIG. 8 illustrates an example layout of inward-facing and outward-facing transceivers of a radar-based sensing system.

Radar antennas are directional, and thus transmission and detection of radar waves from any one antenna (or transmitter-receiver antenna pair) occurs in a relatively limited field of view. However, particular embodiments of the radar-based sensing system described herein may simultaneously detect interactions from a plurality of users (or other objects) situated through an environment. For example, FIG. 8 illustrates an example layout of inward-facing and outward-facing transceivers of a radar-based sensing system. In particular embodiments, the radar-based sensing system may configure the plurality of transceivers 205 to be inward and the plurality of transceivers 210 to be outward. As a result, the transmitters integrated in inward transceivers 205 may cover relatively near (e.g., within 2 feet of display 215) interactions and the transmitters integrated in outward transceivers 210 may cover relatively far interactions. As illustrated in FIG. 8, the plurality of transceivers 205 and transceivers 210 may be disposed on a substantially rectangular edge of the radar-based sensing system 200 surrounding the display 215. Transceivers 205A-205D may be disposed in the corners of the substantially rectangular edge and transceivers 210A-210D may be disposed in between the corners of the substantially rectangular edge. In particular embodiments, each of the transmitters integrated in inward transceivers 205 may transmit the majority of its radio waves in a direction parallel to the display 215. In particular embodiments, each of the transmitters integrated in inward transceivers 210 may transmit the majority of its radio waves in a direction perpendicular to the display 215. In particular embodiments, one or more receivers integrated in the transceivers 205 and the transceivers 210 may detect reflections and/or scatterings of the transmitted radio waves off one or more objects in the vicinity of the radar-based sensing system. As an example and not by way of limitation, the reflections and/or scatterings may correspond to user interactions with the radar-based sensing system. Although this disclosure illustrates a particular layout of transceivers having a particular orientation, this disclosure contemplates any suitable layout of transceivers with any suitable orientation. For example, this disclosure contemplates adding additional transceivers to the edge of display 215 that are oriented at an angle between parallel and perpendicular to the display.

In particular embodiments, the radar-based sensing system of FIG. 8 may, as a result of inward-facing and outward-facing transceiver, simultaneously track objects relatively near to and relatively far from display 215. For example, the radar-based sensing system of FIG. 8 may track a user moving from near field (e.g., less than 2 feet away from display 215) to far field (e.g., more than 10 feet away).

Figure 9:
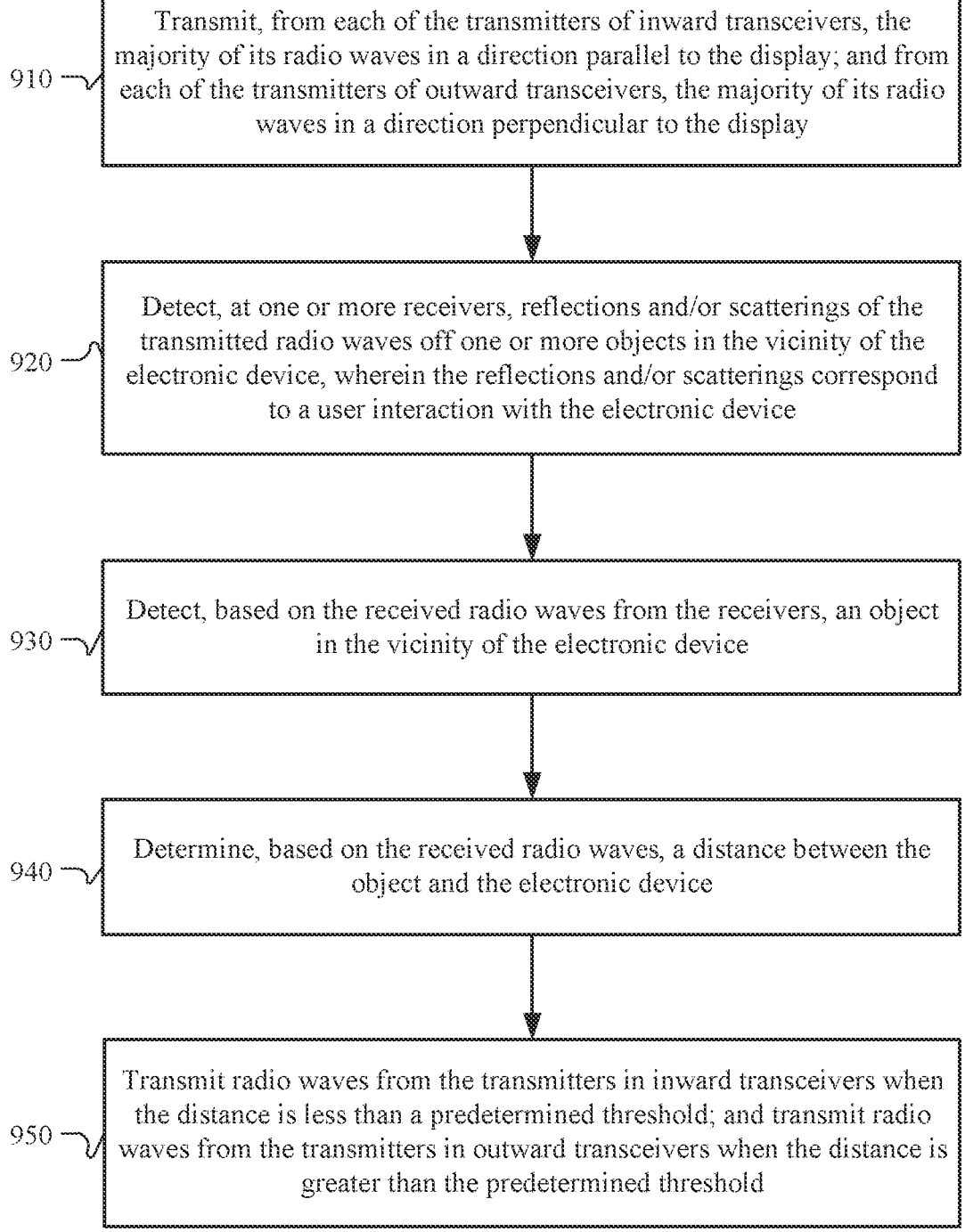
FIG. 9 illustrates an example method for using a radar-based sensing system with inward-facing and outward-facing transceivers.

FIG. 9 illustrates an example method 900 for determining whether to transmit radio waves from inward transceivers 205 or to transmit radio waves from outward transceivers 210. The method may begin at step 910. At step 910, the radar-based sensing system may transmit, from each of the transmitters of inward transceivers 205, the majority of its radio waves in a direction parallel to the display 215; and from each of the transmitters of outward transceivers 210, the majority of its radio waves in a direction perpendicular to the display 215. At step 920, the radar-based sensing system may detect, at one or more receivers, reflections and/or scatterings of the transmitted radio waves off one or more objects in the vicinity of the radar-based sensing system, wherein the reflections and/or scatterings correspond to a user interaction with the radar-based sensing system. At step 930, the radar-based sensing system may detect, based on the received radio waves from the receivers, an object in the vicinity of the radar-based sensing system. As an example and not by way of limitation, the object may include a hand of a user. At step 940, the radar-based sensing system 200 may determine, based on the received radio waves, a distance between the object and the radar-based sensing system. At step 950, the radar-based sensing system may transmit radio waves from the transmitters in inward transceivers 205 when the distance is less than a predetermined threshold; and transmit radio waves from the transmitters in outward transceivers 210 when the distance is greater than the predetermined threshold. As an example and not by way of limitation, the predetermined threshold may be approximately two feet. For example, the radar-based sensing system 200 may detect gestures illustrated in FIG. 5 and/or FIG. 6 based on radio waves from transceivers 205A-205D when users 601-603 are close to the display 215 (e.g., within a distance of 2 feet). When users 601-603 move further away, e.g., more than 2 feet away from the display 215, the radar-based sensing system 200 may detect the same gestures based on radio waves from transceivers 210A-210D. In particular embodiments, the radar-based sensing system may operate both inward-facing and outward-facing transceivers if, e.g., objects are being detected in both near field and far field. In particular embodiments, frames from inward-facing transceivers may be processed according to a processing module, and frames from outward-facing transceivers may be processed according to another or the same processing module. In other words, Detection Module Selection 415 may decide which processing module to use for a subset of transceivers in a given orientation (or, in particular embodiments, even on a transceiver-by-transceiver basis).

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for sensing an object based on electromagnetic radiation, including the particular steps of the method of FIG. 9, this disclosure contemplates any suitable method for sensing an object based on electromagnetic radiation, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

In particular embodiments, a radar-based sensing system may select a transmission operating mode for one or more of its transmitters based on one or more preferences for detecting one or more objects in the vicinity of the radar-based sensing system. The transmission operating mode may include simultaneously transmitting from each of the plurality of transmitters, or transmitting from each transmitter in sequence, or transmitting from one of the plurality of transmitters. For the transmission operating mode of transmitting simultaneously, all transmitters in the plurality of transmitters are activated at substantially the same time. For the transmission operating mode of transmitting from each transmitter in sequence, the one or more receivers are activated after transmitting from one of the transmitters and before transmitting from another one of the transmitters. For example, with reference to FIG. 8, the transmitter of transceiver 210A may transmit, all the receivers of transceivers 210A-D may receive, then the transmitter from transceiver 210B may transmit, and so on. For the transmission operating mode of transmitting from one of the plurality of transmitters, the one or more receivers are activated after transmitting from the one transmitter.

In particular embodiments, the one or more preferences used to select a transmission operating mode may specify imaging the objects at a relatively higher resolution (e.g., at a resolution above a specified resolution threshold) for radar imaging 425. For example, complex scene analysis, detection of detailed user features, near field imaging, or complex gesture recognition may require higher resolution imaging. Correspondingly, the transmission operating mode may include transmitting from each transmitter in sequence with the one or more receivers being activated after transmitting from one of the transmitters and before transmitting from another one of the transmitters. Alternatively, the transmission operating mode may include simultaneously transmitting from each of the plurality of transmitters. When simultaneously transmitting from each of the plurality of transmitters, the transmission operating mode may additionally configure each transmitter to transmit radio waves using a different phase code. As an example and not by way of limitation, each transmitter transmitting radio waves using a different code may be achieved by phase coding. In particular embodiments, the one or more preferences may specify positioning the objects with relatively lower noise (e.g., with noise lower than a specified noise threshold). As an example and not by way of limitation, positioning the objects may be based on Trilateration Module 420. Correspondingly, the transmission operating mode may include transmitting from each transmitter in sequence with the one or more receivers being activated after transmitting from one of the transmitters and before transmitting from another one of the transmitters. Alternatively, the transmission operating mode may include simultaneously transmitting from each of the plurality of transmitters.

When simultaneously transmitting from each of the plurality of transmitters, the transmission operating mode may configure each transmitter to transmit radio waves in a different frequency band. As an example and not by way of limitation, each transmitter transmitting radio waves in a different frequency band may be achieved by carrier coding. In particular embodiments, the one or more preferences may specify imaging the objects at a relatively higher frame rate (e.g., at a frame rate above a specified frame rate threshold). The transmission operating mode may therefore include transmitting from one of the plurality of transmitters with the one or more receivers being activated after transmitting from the transmitter or simultaneously transmitting from each of the plurality of transmitters. When simultaneously transmitting from each of the plurality of transmitters, the transmission operating mode may additionally configure each transmitter to transmit radio waves in a different frequency band or using a different phase code. In particular embodiments, the radar-based sensing system may switch between different transmission operating modes dynamically, e.g., for each frame of frame data 405.

In particular embodiments, the radar-based sensing system 200 may further transmit, from at least some of the plurality of transmitters in accordance with the transmission operating mode, radio waves into an area in the vicinity of the radar-based sensing system 200. The radar-based sensing system 200 may then activate the one or more receivers to detect radio waves reflected off one or more objects in the vicinity of the radar-based sensing system 200.

Figure 10:
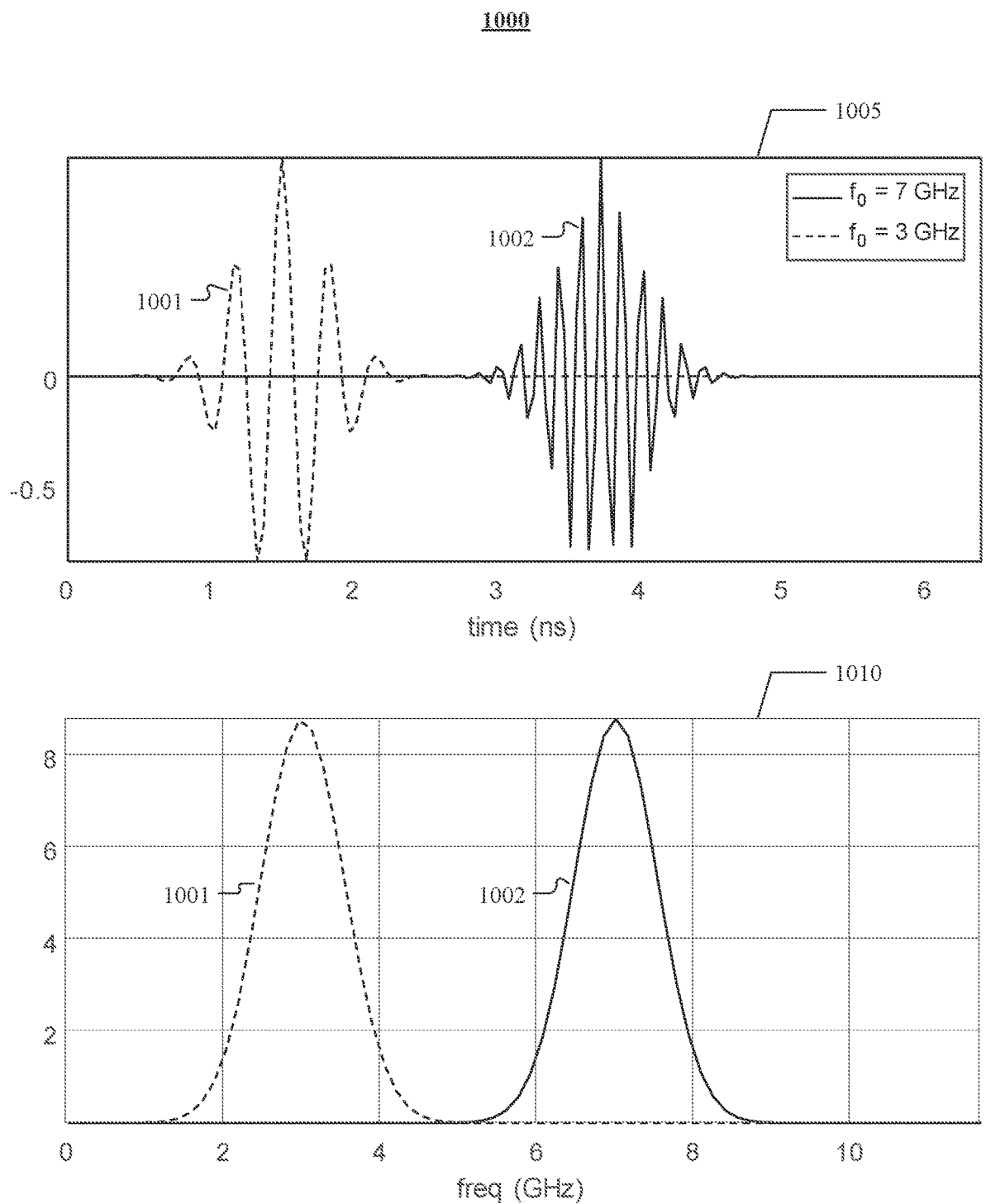
FIG. 10 illustrates an example processing of radio waves by carrier coding.

FIG. 10 illustrates an example processing of radio waves by carrier coding. Carrier coding may allow for simultaneously transmitting from each of the plurality of transmitters, because each transmitter transmits in a unique frequency band. As indicated by the time domain 1005 of FIG. 10, the example of FIG. 10 includes two radio waves, i.e., radio wave 1001 and radio wave 1002. The two radio waves are transmitted simultaneously from 0 ns to approximately 6 ns. In the frequency domain 1010, radio wave 1001 is centered at 3 GHz whereas radio wave 1002 is centered at 7 GHz. The bandwidth is split, which may result in a loss of resolution. As an example and not by way of limitation, carrier coding may be used in applications including coarse scene analysis, presence detection and simple gesture recognition that require low-resolution imaging.

FIG. 11 illustrates an example processing of a radio wave by phase coding. Phase coding may allow for simultaneously transmitting from each of the plurality of transmitters because each transmitter transmits a signal with a unique phase code. As indicated by subfigure 1105 of FIG. 11, radio wave 1101 is phase coded from approximately 4 ns to 13 ns and retains its pure tone from approximately 14 ns to 26 ns. As illustrated in subfigure 1110, the phase coded output of radio wave 1101 has signal-noise-ratio (SNR) loss. In particular embodiments, orthogonal phase code may be used to prevent SNR loss.

In particular embodiments, a radar-based sensing system may detect user interactions based on a plurality of different schemes. In particular embodiments, the radar-based sensing system may transmit radio waves from one of the transmitters in transceivers 205. The radar-based sensing system 200 may then select Trilateration Module 420 for processing the reflected radio waves at the receivers. As an example and not by way of limitation, simple gesture recognition in the near field that requires high frame rate may be achieved. Alternatively, the radar-based sensing system 200 may select Radar Imaging Module 425 for processing the reflected radio waves at the receivers. As an example and not by way of limitation, pose detection in the near field may be achieved accordingly.

In particular embodiments, the radar-based sensing system may transmit radio waves from one of the transmitters in transceivers 210. The radar-based sensing system 200 may then select Trilateration Module 420 for processing the reflected radio waves at the receivers. As an example and not by way of limitation, simple gesture recognition in the far field that requires high frame rate may be achieved accordingly. Alternatively, the radar-based sensing system may select Radar Imaging Module 425 for processing the reflected radio waves at the receivers. As an example and not by way of limitation, pose detection in the far field may be achieved accordingly.

In particular embodiments, a radar-based sensing system may transmit radio waves from each of the transmitters in transceivers 205 in sequence. The radar-based sensing system may then select Trilateration Module 420 for processing the reflected radio waves at the receivers. As an example and not by way of limitation, simple gesture recognition in the near field that only requires low frame rate may be achieved. Alternatively, the radar-based sensing system may select Radar Imaging Module 425 for processing the reflected radio waves at the receivers. As an example and not by way of limitation, complex gesture recognition in the near field that only requires low frame rate may be achieved. In particular embodiments, the radar-based sensing system may transmit radio waves from each of the transmitters in transceivers 210 in sequence. The radar-based sensing system may then select Trilateration Module 420 for processing the reflected radio waves at the receivers. As an example and not by way of limitation, simple gesture recognition in the far field that only requires low frame rate may be achieved. Alternatively, the radar-based sensing system may select Radar Imaging Module 425 for processing the reflected radio waves at the receivers. As an example and not by way of limitation, complex gesture recognition in the far field that only requires low frame rate may be achieved. In particular embodiments, the radar-based sensing system may transmit radio waves from each of the transmitters in both transceivers 205 and transceivers 210 in sequence. The radar-based sensing system may then select Trilateration Module 420 for processing the reflected radio waves at the receivers. As an example and not by way of limitation, simple gesture recognition of multiple users in both near field and far field that only requires low frame rate may be achieved. Alternatively, the radar-based sensing system may select Radar Imaging Module 425 for processing the reflected radio waves at the receivers. As an example and not by way of limitation, complex gesture recognition of multiple users in both near field and far field that only requires low frame rate may be achieved.

In particular embodiments, a radar-based sensing system may simultaneously transmit radio waves from each of the transmitters in transceivers 205. Each transmitter may transmit radio waves in a different frequency band. The radar-based sensing system may then select Trilateration Module 420 for processing the reflected radio waves at the receivers. As an example and not by way of limitation, simple gesture recognition in the near field that requires high frame rate may be achieved. Alternatively, the radar-based sensing system may select Radar Imaging Module 425 for processing the reflected radio waves at the receivers. As an example and not by way of limitation, coarse scene analysis in the near field that requires high frame rate may be achieved. In particular embodiments, the radar-based sensing system may simultaneously transmit radio waves from each of the transmitters in transceivers 210. Each transmitter may transmit radio waves in a different frequency band. The radar-based sensing system may then select Trilateration Module 420 for processing the reflected radio waves at the receivers. As an example and not by way of limitation, simple gesture recognition in the far field that requires high frame rate may be achieved. Alternatively, the radar-based sensing system may select Radar Imaging Module 425 for processing the reflected radio waves at the receivers. As an example and not by way of limitation, coarse scene analysis in the far field that requires high frame rate may be achieved. In particular embodiments, the radar-based sensing system may simultaneously transmit radio waves from each of the transmitters in both transceivers 205 and transceivers 210. Each transmitter may transmit radio waves in a different frequency band. The radar-based sensing system may then select Trilateration Module 420 for processing the reflected radio waves at the receivers. As an example and not by way of limitation, simple gesture recognition of multiple users in both near field and far field that requires high frame rate may be achieved. Alternatively, the radar-based sensing system may select Radar Imaging Module 425 for processing the reflected radio waves at the receivers. As an example and not by way of limitation, presence detection of multiple users in both near field and far field that requires high frame rate may be achieved accordingly.

In particular embodiments, the radar-based sensing system may simultaneously transmit radio waves from each of the transmitters in transceivers 205. Each transmitter may transmit radio waves using a different phase code. The radar-based sensing system may then select Trilateration Module 420 for processing the reflected radio waves at the receivers. As an example and not by way of limitation, simple gesture recognition in the near field that requires high frame rate may be achieved. Alternatively, the radar-based sensing system may select Radar Imaging Module 425 for processing the reflected radio waves at the receivers. As an example and not by way of limitation, complex scene analysis in the near field that requires high resolution may be achieved. In particular embodiments, the radar-based sensing system may simultaneously transmit radio waves from each of the transmitters in transceivers 210. Each transmitter may transmit radio waves using a different phase code. The radar-based sensing system may then select Trilateration Module 420 for processing the reflected radio waves at the receivers. As an example and not by way of limitation, simple gesture recognition in the far field that requires high frame rate may be achieved. Alternatively, the radar-based sensing system may select Radar Imaging Module 425 for processing the reflected radio waves at the receivers. As an example and not by way of limitation, complex gesture recognition in the far field that requires high resolution may be achieved. In particular embodiments, the radar-based sensing system may simultaneously transmit radio waves from each of the transmitters in both transceivers 205 and transceivers 210. Each transmitter may transmit radio waves using a different phase code. The radar-based sensing system may then select Trilateration Module 420 for processing the reflected radio waves at the receivers. As an example and not by way of limitation, simple gesture recognition of multiple users in both near field and far field that requires high frame rate may be achieved. Alternatively, the radar-based sensing system may select Radar Imaging Module 425 for processing the reflected radio waves at the receivers. As an example and not by way of limitation, complex gesture recognition of multiple users in both near field and far field that requires high resolution may be achieved.

In particular embodiments, the radar-based sensing system may dynamically switch between different configurations of transmitters and different processing of radio waves. The radar-based sensing system may dynamically switch between transmitting radio waves with one transmitter, transmitting radio waves with each transmitter sequentially, and transmitting radio waves with all the transmitters simultaneously. The radar-based sensing system may analyze a scene to determine whether to transmit radio waves with one transmitter, transmit radio waves with each transmitter sequentially, or transmit radio waves with all the transmitters simultaneously. In particular embodiments, the radar-based sensing system may also dynamically switch between splitting radio waves into different frequency bands and coding radio waves using different phase codes when transmitting radio waves with all the transmitters simultaneously. The radar-based sensing system may use a unique processing chain for each scenario (e.g., coding radio waves using different phase codes when transmitting radio waves with all the transmitters simultaneously). In particular embodiments, the radar-based sensing system may achieve higher frame rates for simple detection tasks such as simple gesture recognition and presence detection. In particular embodiments, the radar-based sensing system may have scene-specific imaging characteristics. In particular embodiments, the radar-based sensing system may use only one single hardware configuration to handle multiple detection tasks as switching between different configurations of transmitters and different type of processing of radio waves may be achieved via software configuration.

FIG. 12 illustrates an example method 1200 for dynamically operating a radar-based sensing system having different transmission operating modes. The method may start at step 1210. At step 1210, the radar-based sensing system may select, based on one or more preferences for detecting one or more objects in the vicinity of the radar-based sensing system, a transmission operating mode for the plurality of transmitters. For example, a preference may be high resolution imaging for near field gesture recognition. Consequently, the radar-based sensing system may select simultaneously transmitting from each of the multiple transmitters coupled with phase coding as a transmission operating mode. At step 1220, the method may transmit, from at least some of the plurality of transmitters in accordance with the transmission operating mode, radio waves into an area in the vicinity of the radar-based sensing system. For example, the radio waves may be processed by phase coding and be transmitted within 2 feet of the radar-based sensing system. At step 1230, the radar-based sensing system may activate the one or more receivers to detect radio waves reflected off one or more objects in the vicinity of the radar-based sensing system. For example, the objects may be multiple hands of multiple users close to the display 215 of the radar-based sensing system.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for sensing an object based on electromagnetic radiation, including the particular steps of the method of FIG. 12, this disclosure contemplates any suitable method for sensing an object based on electromagnetic radiation, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

As described above, a radar-based sensing system may dynamically select a set of transmitters at which to transmit a radar signal(s), e.g., based on the orientation of the transmitters. The radar-based sensing system may dynamically select a transmission operating mode to use to transmit the radar signal(s). The radar-based sensing system may dynamically select a processing module to use to process received a radar signal(s). The dynamic selection for each of these features may occur on a frame-by-frame basis, may apply to all frames until some specified operating condition changes, and/or may occur during an initialization phase during which initial scene detection occurs. A radar-based sensing system may have each of these dynamic selection capabilities. As explained above, dynamic selection may be based on various interaction detection requirements, such as requirements specified by an application or a process. Each selection by itself corresponds to a particular set of interaction benefits. Likewise, each combination of selections corresponds to a particular set of benefits, as described more fully above.

In places, this disclosure describes thresholds to which to compare a particular interaction detection requirement, such as a resolution threshold for a particular resolution requirement. This disclosure contemplates that such requirements and/or thresholds may be specified quantitatively (e.g., numerically) or qualitatively (e.g., by specifying that high resolution is a priority or by specifying that a requirement is the highest resolution possible). For example, a threshold may be a binary indication of whether a particular parameter, such as resolution, is or is not a priority in a particular interaction-detection instance. For example, a requirement may be the highest resolution possible, and the threshold may be whether high resolution is a priority. Thus, in this example, the requirement would specify a resolution above the threshold because high resolution is a priority, according to the requirements.

Figure 13:
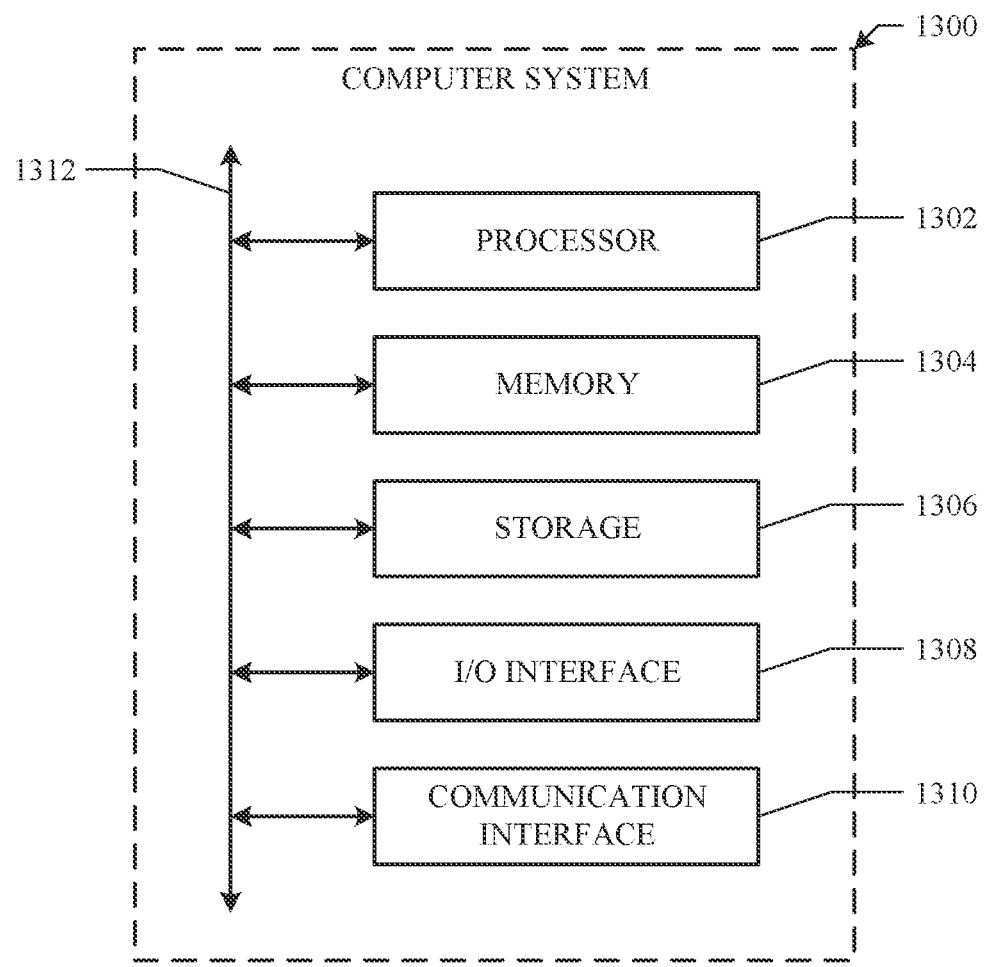
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   at an electronic device that includes a plurality of radar-based transmitters and one or more radar-based receivers;
      transmitting, from the plurality of radar-based transmitters, radio waves into an area in a vicinity of the electronic device, wherein the transmitting is performed according to a transmission operating mode selected from a plurality of transmission operating modes including:
         a first mode in which each radar-based transmitter transmits in sequence such that the one or more radar-based receivers are activated after transmitting from one of the plurality of radar-based transmitters and before transmitting from another one of the plurality of radar-based transmitters; and
         a second mode in which each of the radar-based transmitters transmits simultaneously;
      receiving, at the one or more radar-based receivers, the radio waves reflected off one or more objects in the vicinity of the electronic device; and
      processing the radio waves as reflected off the one or more objects using a radar imaging module;
   wherein the electronic device includes a display, and wherein the transmitting includes:
      transmitting, from a first set of the plurality of radar-based transmitters, first radio waves, wherein the first set of the plurality of radar-based transmitters face inward toward a center of the display and transmit a majority of the first radio waves in a direction parallel to the display; and
      transmitting, from a second set of the plurality of radar-based transmitters, second radio waves, wherein the second set of the plurality of radar-based transmitters face outward from the display and transmit a majority of the second radio waves in a direction that is perpendicular to the display.

2. The method of claim 1, comprising:
   selecting the transmission operating mode from the plurality of transmission operating modes on a frame-by-frame basis for each temporally sequential frame of data.

3. The method of claim 1, comprising:
   dynamically switching between two or more of the plurality of transmission operating modes during operation based on a requirement for imaging the one or more objects above a specified resolution threshold.

4. The method of claim 1, comprising:
   dynamically switching between different ones of the plurality of transmission operating modes during operation based on a required frame rate.

5. The method of claim 1, wherein the processing the radio waves as reflected off the one or more objects using the radar imaging module comprises:
   generating a 3D image from the radio waves as reflected, wherein the 3D image represents a scene corresponding the area in the vicinity of the electronic device;
   performing scene analysis on the scene by detecting a user or a portion of the user from the 3D image; and
   detecting at least one of an in-the-air gesture or a touch gesture from the user using the plurality of radar-based transmitters and the one or more radar-based receivers.

6. The method of claim 5, comprising:
   selecting, based on the scene analysis, a portion of the scene to track; or
   in response to the scene analysis detecting a plurality of users from the 3D image, selecting a user from the plurality of users detected for tracking.

7. The method of claim 1, wherein the processing the radio waves as reflected off the one or more objects using the radar imaging module is performed in response to determining that a signal corresponding to the radio waves as reflected has a predetermined level of noise that exceeds a threshold level of noise.

8. The method of claim 1, further comprising:
   determining one or more stored application requirements for detecting user gestures; and
   in response to the determining the one or more stored application requirements for detecting user gestures, selecting the image processing module from a plurality of different processing modules configured to process the radio waves as reflected off the one or more objects.

9. The method of claim 1, wherein the first set and the second set of the plurality of radar-based transmitters and the one or more radar-based receivers surround the display.

10. The method of claim 1, wherein the processing the radio waves as reflected off the one or more objects using the radar imaging module comprises:
selecting the first radio waves or the second radio waves, as reflected, based on a distance of the one or more objects from the electronic device.

11. The method of claim 9, wherein the first set of the plurality of radar-based transmitters are disposed at corners of the display and the second set of the plurality of radar-based transmitters are disposed between the corners of the display.

12. The method of claim 9, wherein the processing the radio waves as reflected off the one or more objects using the radar imaging module comprises:
processing the first radio waves, as reflected, to detect at least one interaction of the one or more objects located within a predetermined distance of the electronic device; and
processing the second radio waves, as reflected, to detect at least one interaction of the one or more objects located outside of the predetermined distance of the electronic device.

13. A system, comprising:
a display;
a plurality of radar-based transmitters including:
 a first set of the plurality of radar-based transmitters facing inward toward a center of the display and configured to transmit first radio waves, wherein a majority of the first radio waves are transmitted in a direction parallel to the display; and
 a second set of the plurality of radar-based transmitters facing outward from the display and configured to transmit second radio waves, wherein a majority of the second radio waves are transmitted in a direction that is perpendicular to the display;
one or more radar-based receivers;
one or more processors configured to initiate operations comprising:
 transmitting, from both the first set and the second set of the plurality of radar-based transmitters, radio waves including the first radio waves and the second radio waves into an area in a vicinity of an electronic device;
 receiving, at the one or more radar-based receivers, the radio waves reflected off one or more objects in the vicinity of the electronic device;
 determining a distance of one or more objects based on the radio waves reflected off the one or more objects in the vicinity of the electronic device; and
 based on the determined distance of the one or more objects, transmitting the first radio waves from the first set of the plurality of radar-based transmitters, transmitting the second radio waves from the second set of the plurality of radar-based transmitters, or transmitting both the first radio waves from the first set of the plurality of radar-based transmitters and the second radio waves from the second set of the plurality of radar-based transmitters.

14. The system of claim 13, further comprising:
generating a 3D image from the radio waves as reflected, wherein the 3D image represents a scene corresponding the area in the vicinity of the electronic device; and
performing scene analysis on the scene by detecting a user or a portion of the user from the 3D image.

15. The system of claim 14, wherein the one or more processors initiate operations comprising:
detecting at least one of an in-the-air gesture or a touch gesture from the user based on the radio waves reflected off the one or more objects in the vicinity of the electronic device.

16. The system of claim 14, wherein the one or more processors initiate operations comprising:
selecting, based on the scene analysis, a portion of the scene to track; or
in response to the scene analysis detecting a plurality of users, selecting a user from the plurality of users detected for tracking.

17. The system of claim 13, wherein the plurality of radar-based transmitters are configurable to operate in a transmission operating mode selected from a plurality of transmission operating modes including a first mode in which each radar-based transmitter transmits in sequence such that the radar-based receivers are activated after transmitting from one of the radar-based transmitters and before transmitting from another one of the radar-based transmitters and a second mode in which each of the radar-based transmitters transmits simultaneously.

18. The system of claim 17, wherein the transmission operating mode is selected from the plurality of transmission operating modes on a frame-by-frame basis for each temporally sequential frame of data.

19. A system, comprising:
a display;
a first plurality of radar-based transceivers;
a second plurality of radar-based transceivers;
wherein each radar-based transceiver includes a radar-based transmitter and a radar-based receiver;
wherein the first plurality of radar-based transceivers faces inward toward a center of the display and is configured to transmit first radio waves into a first area in a vicinity of an electronic device and receive the first radio waves reflected off of one or more first objects in the first area, wherein the first plurality of radar-based transceivers is configured to detect touch gestures from one or more users;
wherein the second plurality of radar-based transceivers faces outward from the display and is configured to transmit second radio waves into a second area in the vicinity of the electronic device and receive the second radio waves reflected off of one or more second objects in the second area, wherein the second plurality of radar-based transceivers is configured to detect in-the-air gestures from the one or more users; and
one or more processors configured to process at least one of the first radio waves as reflected or the second radio waves as reflected to determine the touch gestures and the in-the-air gestures;
wherein the first plurality of radar-based transceivers is configured to transmit a majority of the first radio waves in a direction parallel to the display and the second plurality of radar-based transceivers is configured to transmit a majority of the second radio waves in a direction that is perpendicular to the display.

20. The system of claim 19, wherein the touch gestures are detected from a first user and the in-the-air gestures are detected from a second and different user.

\* \* \* \* \*